US010632886B2

(12) United States Patent
Okuma et al.

(10) Patent No.: US 10,632,886 B2
(45) Date of Patent: Apr. 28, 2020

(54) VEHICLE SEAT

(71) Applicant: TS TECH CO., LTD., Saitama (JP)

(72) Inventors: Kei Okuma, Tochigi (JP); Naoya Nishimoto, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 16/536,370

(22) Filed: Aug. 9, 2019

(65) Prior Publication Data

US 2019/0359104 A1 Nov. 28, 2019

Related U.S. Application Data

(63) Continuation of application No. 15/660,358, filed on Jul. 26, 2017, now Pat. No. 10,384,576.

(30) Foreign Application Priority Data

Aug. 3, 2016 (JP) ................................ 2016-152626

(51) Int. Cl.

| | |
|---|---|
| ***B60N 2/80*** | (2018.01) |
| ***B60N 2/803*** | (2018.01) |
| ***B60N 2/75*** | (2018.01) |
| ***B60N 2/36*** | (2006.01) |
| ***B60N 2/894*** | (2018.01) |
| *B60N 2/64* | (2006.01) |

(52) U.S. Cl.

CPC ............... *B60N 2/80* (2018.02); *B60N 2/366* (2013.01); *B60N 2/757* (2018.02); *B60N 2/79* (2018.02); *B60N 2/803* (2018.02); *B60N 2/894* (2018.02); *B60N 2/64* (2013.01); *B60N 2205/35* (2013.01)

(58) Field of Classification Search

CPC . B60N 2/80; B60N 2/894; B60N 2/64; B60N 2/806; B60N 2/897

USPC ................ 297/391, 396, 397, 399, 400, 408

See application file for complete search history.

(56) References Cited

U.S. PATENT DOCUMENTS

| | | | |
|---|---|---|---|
| 4,840,428 | A | 6/1989 | Kobayashi et al. |
| 5,378,043 | A | 1/1995 | Viano et al. |
| 5,397,170 | A | 3/1995 | Shrock |
| 5,713,634 | A | 2/1998 | Koike |
| 7,318,626 | B2 | 1/2008 | Ohchi et al. |
| 7,661,758 | B1 | 2/2010 | Veine et al. |
| 8,246,112 | B2 | 8/2012 | Yasuda et al. |
| 8,602,492 | B2 | 12/2013 | Nakaya et al. |
| 2009/0152925 | A1 | 6/2009 | Kim |
| 2011/0101760 | A1 | 5/2011 | Otsuka |
| 2011/0148170 | A1 | 6/2011 | Grable et al. |

(Continued)

FOREIGN PATENT DOCUMENTS

| | | |
|---|---|---|
| JP | S60-10557 U | 1/1985 |
| JP | 2007-269100 A | 10/2007 |

*Primary Examiner* — Mark R Wendell

(74) *Attorney, Agent, or Firm* — Michael Best & Friedrich LLP

(57) ABSTRACT

A vehicle seat is thinned in a seat front to back direction. In the vehicle seat, a center seat has a seat back frame, a headrest which is provided above the seat back frame, a pillar which supports the headrest, and brackets which mount the pillar to the seat back frame. The pillar is arranged between the brackets and the seat back frame, the brackets have a weld bead which holds the pillar and a portion where a welding trace to be mounted to the seat back frame is formed, and the weld bead and the portion where the welding trace is formed are arranged at different positions in a direction which intersects a front to back direction of the center seat.

9 Claims, 6 Drawing Sheets

(56) References Cited

U.S. PATENT DOCUMENTS

| | | | |
|---|---|---|---|
| 2012/0112512 | A1 | 5/2012 | Sakai et al. |
| 2012/0112513 | A1 | 5/2012 | Mitsuoka et al. |
| 2012/0319449 | A1 | 12/2012 | Schenten et al. |
| 2013/0033083 | A1 | 2/2013 | Sei et al. |
| 2013/0270878 | A1 | 10/2013 | Adachi et al. |
| 2014/0265507 | A1 | 9/2014 | Fredriksson et al. |
| 2015/0266402 | A1 | 9/2015 | Lutzka |
| 2015/0367764 | A1 | 12/2015 | Laperriere, III et al. |
| 2016/0150885 | A1 | 6/2016 | Peterson et al. |
| 2017/0259719 | A1 | 9/2017 | Hamano et al. |

VEHICLE SEAT

CROSS REFERENCE TO RELATED APPLICATIONS

This application is a continuation of U.S. patent application Ser. No. 15/660,358, filed on Jul. 26, 2017. Further, this application is based on and claims the benefit of priority from the prior Japanese Patent Application JP 2016-152626, filed on Aug. 3, 2016, the entire contents of which are incorporated herein by reference.

BACKGROUND OF THE INVENTION

Field of the Invention

The present invention relates to a vehicle seat, and, more specifically, to a vehicle seat provided with a mounting member for mounting a pillar to a seat back.

Description of the Related Art

Conventionally, in vehicle seats provided with a headrest, there are a vehicle seat in which a headrest is fixed to a seat back by a mounting member so as to be able to swing, a vehicle seat in which a headrest is directly fixed to a seat back so as not to be moved, and the like.

As an example of where a headrest is mounted to a seat back by a mounting member so as to be able to swing, Japanese Unexamined Patent Application Publication No. 2007-269100 discloses a vehicle seat in a structure in which they are fixed by fitting a mounting member, into which a pillar is inserted, in a frame.

Moreover, as an example of where a headrest is directly fixed to a seat back, Microfilm of Japanese Utility Model Application No. 58-102746 (Japanese Unexamined Utility Model Application Publication No. 60-10557) discloses a technique in which they are fixed by welding after inserting a cylindrical pillar in an opening in the upper portion of a frame.

However, in the structure of Japanese Unexamined Patent Application Publication No. 2007-269100, a portion holding the pillar and a portion abutting (fixed to) the frame is aligned in a seat front to back direction, and therefore a large space in the seat front to back direction had to be taken.

Moreover, rather than fixing the headrest to the seat back so as to be able to swing, it is conceivable that welding is applied in order to enhance bonding strength. In particular, if bonding of the pillar and the frame can be done by laser welding, bonding time can be shortened than by arc welding that is another welding method and generation of welding heat can be suppressed.

However, the structure of Microfilm of Japanese Utility Model Application No. 58-102746 (Japanese Unexamined Utility Model Application Publication No. 60-10557) was suited for arc welding but unsuited for laser welding because the cylindrical pillar needs to be welded to the frame. That is, in laser welding, a large weld bead as in arc welding is not generated, and therefore it is hard to fix the pillar, which is a cylindrical member, to the frame, and it was difficult to enhance bonding strength of the pillar and the frame.

Moreover, a lower end side of the pillar described particularly in FIG. 5 of Microfilm of Japanese Utility Model Application No. 58-102746 (Japanese Unexamined Utility Model Application Publication No. 60-10557) projects downward from a seat back frame main body, and the lower end side of the pillar sometimes touched a pad and a skin and damaged them.

SUMMARY OF THE INVENTION

The present invention has been made in view of the above-described problems, and an object thereof is to thin a vehicle seat in a seat front to back direction.

Moreover, another object of the present invention is to enhance bonding strength of a pillar and a mounting member.

Moreover, still another object of the present invention is to suppress a pad and a skin from being damaged.

In accordance with a vehicle seat of the present invention, the above problems are solved by the vehicle seat including a seat back frame, a headrest which is provided above the seat back frame, a pillar which supports the headrest, and a mounting member which mounts the pillar to the seat back frame, in which the pillar is arranged between the mounting member and the seat back frame, the mounting member has a holding part which holds the pillar and a fixed part which is mounted to the seat back frame, and the holding part and the fixed part are arranged at different positions in a direction which intersects a front to back direction of the vehicle seat.

In accordance with the above configuration, the holding part and the fixed part of the mounting member are arranged at different positions at the right and left of the vehicle seat, and an overlapping portion in a seat front to back direction for mounting the pillar to the seat back frame can be reduced, and therefore the vehicle seat can be thinned in the seat front to back direction.

Moreover, the pillar preferably abuts the seat back frame.

In accordance with the above configuration, the pillar abuts the seat back frame and there is no other member therebetween, and therefore it becomes possible to further thin the vehicle seat.

Moreover, the holding part preferably has a curved form along a peripheral surface of a part of the pillar.

In accordance with the above configuration, the holding part has a curved form along the peripheral surface of a part of the pillar, and thereby variation in the distance between the pillar and the mounting member is suppressed, and bonding strength of the pillar and the mounting member can be enhanced when these are welded.

Moreover, preferably, the holding part is formed with an opening, an edge portion of the opening extends in the direction which intersects the front to back direction of the vehicle seat, and in the edge portion of the opening, a weld bead which bonds the pillar and the mounting member is formed.

In accordance with the above configuration, the weld bead is formed in the edge portion of the opening extending not in the front to back direction of the vehicle seat but in the direction which intersects the front to back direction, and therefore the vehicle seat can be thinned in the seat front to back direction.

Moreover, in a lower end portion of the mounting member, a front cover part which extends below a lower end portion of the pillar and covers the lower end portion of the pillar from the front is preferably provided.

In accordance with the above configuration, the front cover part covers the lower end portion of the pillar, and thereby capable of suppressing the pillar lower end portion from hitting against a pad and a skin and damaging them.

Moreover, in the lower end portion of the mounting member, a lower cover part which extends backwardly and covers the lower end portion of the pillar from below is preferably provided.

In accordance with the above configuration, the lower cover part covers the lower end portion of the pillar, and thereby capable of suppressing the pillar lower end portion from hitting against the pad and the skin and damaging them.

Moreover, the fixed part may be a portion which is formed with a linear welding trace.

In accordance with the above configuration, by laser welding, the mounting member and the seat back frame can be quickly welded in a portion where a linear welding trace such as in a C-shape or a J-shape is formed.

Moreover, a striker member provided at a different position in the direction which intersects the front to back direction of the vehicle seat with respect to the pillar may be included, and the striker member may be arranged between the mounting member and the seat back frame.

In accordance with the above configuration, the striker member does not overlap with the pillar in the front to back direction, and therefore it becomes possible to thin the vehicle seat.

Moreover, two or more mounting members provided at different positions at the right and left may be included, and a connecting member which connects at least two of the two or more mounting members may be provided.

In accordance with the above configuration, rigidity of the mounting member can be enhanced by connecting the mounting members by means of the connecting member. Moreover, by the connecting member, forward movement of members such as an armrest board located between the mounting members can also be suppressed.

Further, the connecting member may be a linear wire member.

In accordance with the above configuration, the connecting member is the wire member, and thereby capable of suppressing interference with other members.

In accordance with the present invention, the vehicle seat can be thinned in the seat front to back direction.

Moreover, in accordance with the present invention, bonding strength of the pillar and the mounting member can be enhanced when these are welded.

Moreover, in accordance with the present invention, the pad and the skin can be suppressed from being damaged.

Moreover, in accordance with the present invention, the mounting member and the seat back frame can be quickly welded in a portion where a linear welding trace is formed.

Moreover, in accordance with the present invention, rigidity of the mounting member can be enhanced, and forward movement of members located between the mounting members can be suppressed.

Moreover, the connecting member can be suppressed from interfering with other members.

BRIEF DESCRIPTION OF THE DRAWINGS

FIG. 4 shows a IV portion of FIG. 2 and is a perspective view showing brackets which mount a headrest frame and the like.

DETAILED DESCRIPTION

Hereinafter, the configuration of a vehicle seat according to an embodiment of the present invention will be described. It should be noted that the embodiment described below is for facilitating understanding of the present invention and does not intend to limit the present invention. As a matter of course, the present invention can be changed and improved without departing from the gist thereof, and equivalents thereof are included in the present invention.

In addition, in the following description, a "front to back direction" means a front to back direction viewed from a seated person seated on the vehicle seat, and is a direction corresponding to a traveling direction of a general vehicle. A "left and right direction" means a width direction of the vehicle seat. A "height direction" means a height direction of the vehicle seat, and corresponds to an up and down direction when viewed the vehicle seat from the front.

<Basic Configuration of Automotive Vehicle Seat Set>

Firstly, the basic configuration of an automotive vehicle seat set SS including side seats Sa and a center seat Sb as vehicle seats according to the present embodiment will be described with reference to FIG. 1. It should be noted that FIG. 1 is a perspective view showing the automotive vehicle seat set SS for rear seat according to one embodiment of the present invention.

Figure 1:
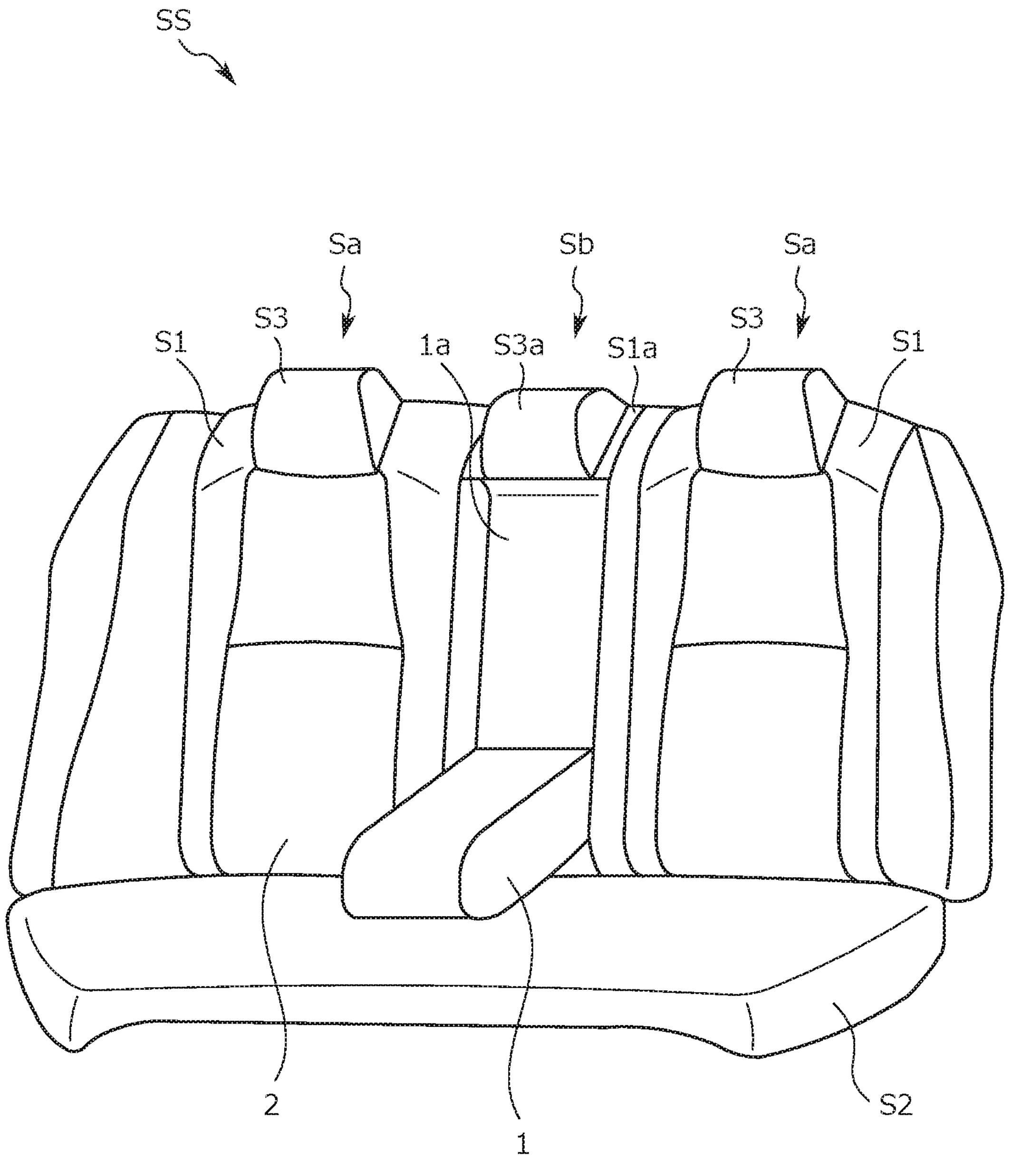
FIG. 1 is a perspective view showing an automotive vehicle seat set according to one embodiment of the present invention.

The automotive vehicle seat set SS according to the present embodiment has almost the same configuration from the standpoint of appearance as a general automotive vehicle seat set on which three persons can be seated, and as shown in FIG. 1, is composed of the side seats Sa located on both sides, and the center seat Sb located in the center.

The side seats Sa and the center seat Sb have seat backs S1, S1*a* and headrests S3, S3*a* respectively, and share a seat cushion S2. Moreover, each of the side seats Sa and the center seat Sb includes a skin 2 on the outside surface thereof.

In particular, to the seat back S1*a* of the center seat Sb, an armrest 1 on which the arms of the seated persons on the side seats Sa can put is mounted, and an armrest storage part 1*a* which stores the armrest 1 so as to be capable of being drawn forward is formed.

Specifically, the armrest storage part 1*a* is a concave part formed in the center seat Sb, and its length in a direction, which is a substantially up and down direction, along the seat back S1*a* is formed longer than the length in a seat right and left direction.

The armrest 1 is mounted so as to be pivotable in the front to back direction around a horizontal axis laid on the lower side of the armrest storage part 1*a*.

<Internal Configuration of Side Seat and Center Seat>

Figure 2:
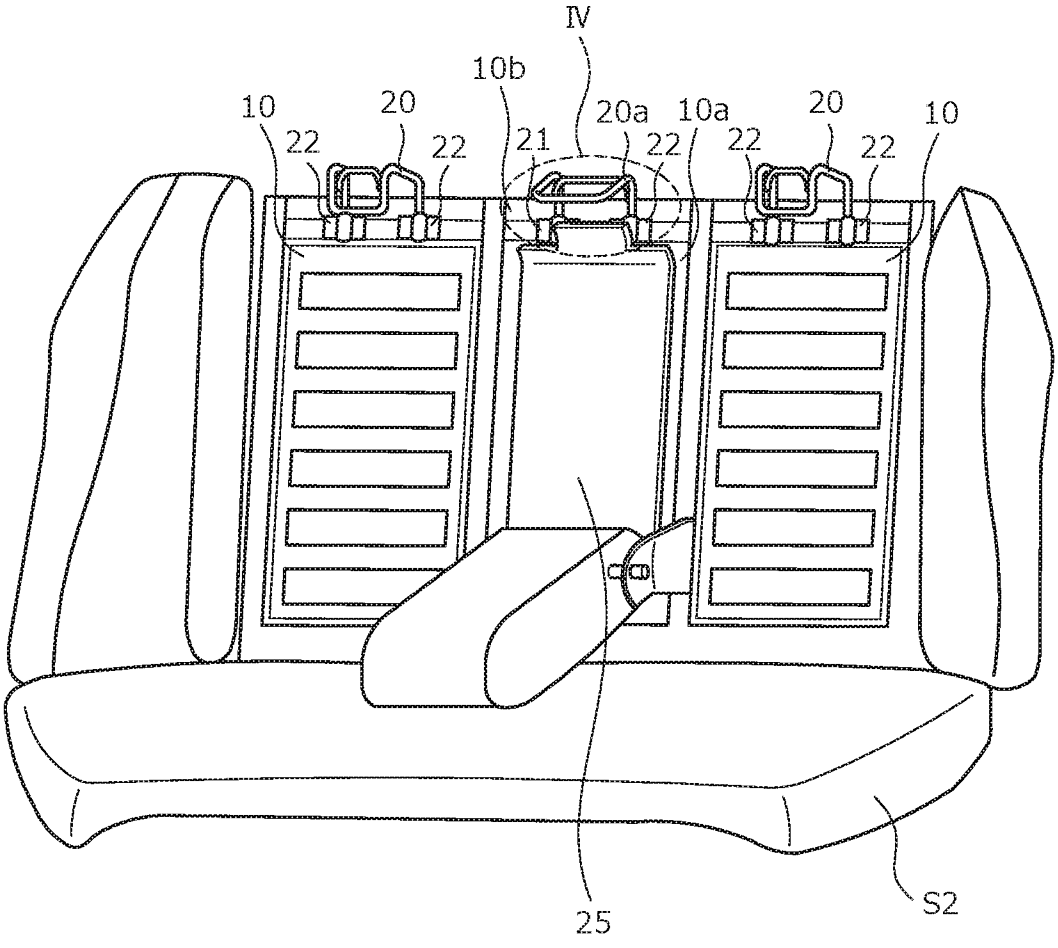
FIG. 2 is a perspective view showing a state that a skin and a cushion pad of a part of the automotive vehicle seat set shown in FIG. 1 are removed and seat back frames and the like are exposed.
Figure 3:
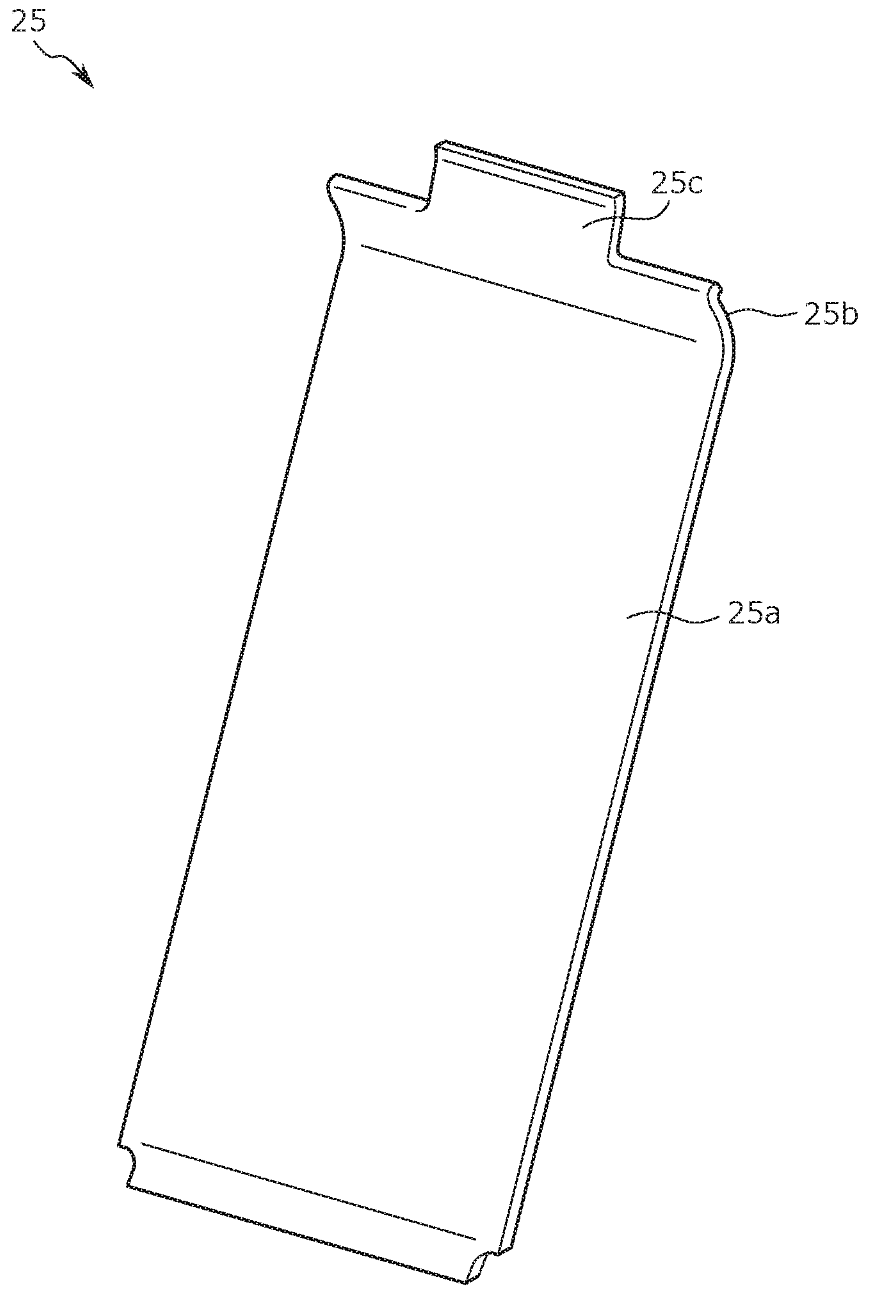
FIG. 3 is a perspective view showing an armrest board to be mounted to the seat back frame.

Next, with reference to mainly FIG. 2 and FIG. 3, seat back frames 10, 10*a* and an armrest board 25 which are provided in the interior of the side seats Sa and the center seat Sb will be described. In addition, FIG. 2 is a perspective view showing a state that the skin 2 and a cushion pad (not shown) of a part of the automotive vehicle seat set SS shown in FIG. 1 are removed and the seat back frames 10, 10*a* and the like are exposed, and FIG. 3 is a perspective view showing the armrest board 25 to be mounted to the seat back frame 10*a*.

The side seats Sa and the center seat Sb include the seat back frames 10, 10*a* serving as frameworks of the seat backs S1, S1*a*, and headrest frames 20, 20*a* serving as frameworks of a headrest S3 and supporting it, respectively, in the interior thereof.

Figure 5:
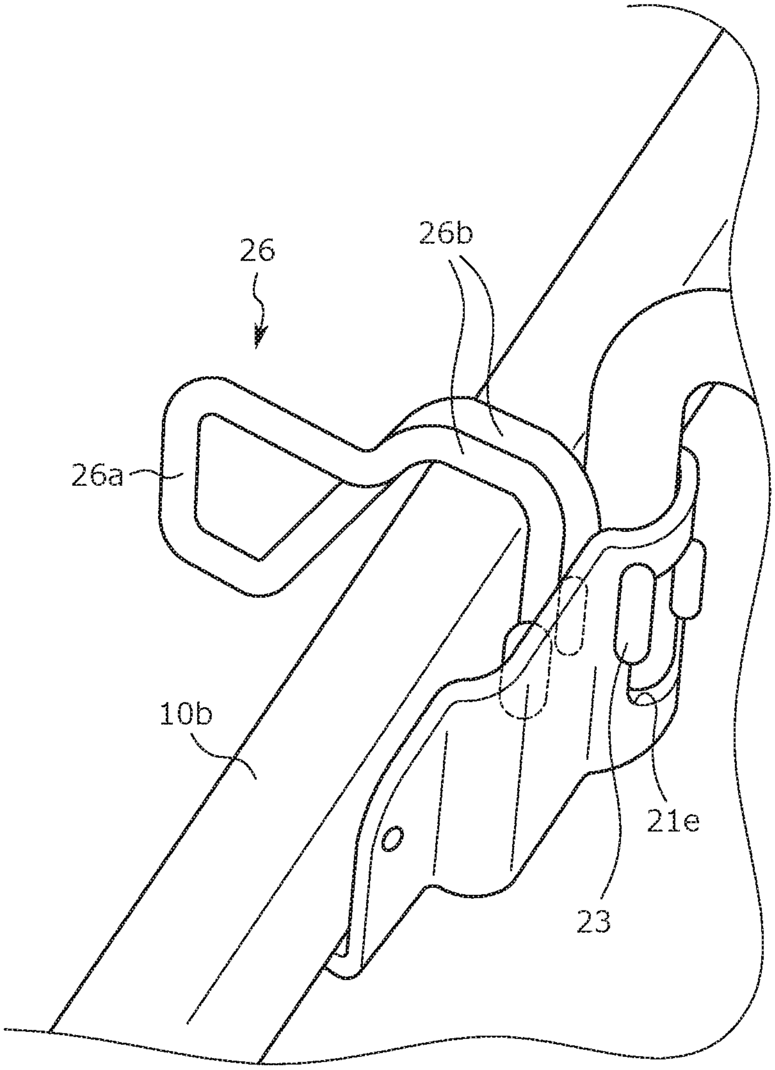
FIG. 5 shows the brackets and a striker member from a V direction of FIG. 4 and is a perspective view showing a mounted state of the striker member.

In particular, to an upper frame 10*b* which is a member constituting the seat back frame 10*a* of the center seat Sb and extends in the seat right and left direction in the upper end portion of the seat back frame 10*a*, a striker member 26 shown in FIG. 5 and described later is mounted by a bracket 21 described later. To the striker member 26, a belt (not shown) is mounted, and the belt is fixed or released to a vehicle body, and thereby capable of changing the state of the automotive vehicle seat set SS to a rising state or a falling state. Specifically, the striker member 26 is formed by a pipe, and has an annular part 26*a* which is formed so that the belt (not shown) is mounted, and both end parts 26*b* which are formed to be adjacent. Further, the striker member 26 is welded to the rear surface of the bracket 21 so that the annular part 26*a* is arranged at the rear side of the upper frame 10*b* and the both end parts 26*b* are arranged at the front side of the upper frame 10*b* in a state that the bracket 21 is mounted to the upper frame 10*b*.

The headrest frames 20, 20*a* and brackets 21, 22 described later are bonded by arc welding, and the upper frame 10*b* of the seat back frames 10, 10*a* and the brackets 21, 22 are bonded by laser welding. It should be noted that a fixing (bonding) method of the upper frame 10*b* and the brackets 21, 22 is not limited to laser welding, and may be done with bolts and nuts, tapping screws, calking pins or the like.

Further, as shown in FIG. 2 and FIG. 3, on the front surface side of the seat back frame 10*a* included in the center seat Sb, the armrest board 25 serving as a decorative laminate of the armrest storage part 1*a* is mounted.

The armrest board 25 is formed into a plate-shape, and is mounted to the seat back frame 10*a* so that a short direction of the armrest board 25 is directed to the seat right and left direction and a long direction of the armrest board 25 is directed to a direction, which is a substantially up and down direction, along the seat back S1*a*.

Specifically, the armrest board 25 is composed of a main body part 25*a*, a folded part which extends to be bent from the upper end side to the front side of the main body part 25*a*, and a bent shape part 25*c* which extends to be bent upwardly from a tip of the folded part 25*b*.

The main body part 25*a* is located in a position facing the rear surface of the armrest 1 in a state that the armrest board 25 is mounted to the seat back S1*a* and in a state that the armrest 1 is stored.

The folded part 25*b* is located in a position facing the upper surface of the armrest 1 in a state that the armrest board 25 is mounted to the seat back S1*a* and in a state that the armrest 1 is stored.

The bent shape part 25*c* is formed to be narrower than the main body part 25*a* and the folded part 25*b*, and is located between two pillars 20*b* constituting the headrest frame 20*a* in a state that the armrest board 25 is mounted to the seat back S1*a*. In the case of a vehicle accident and the like, the bent shape part 25*c* abuts a wire member 27 shown in FIG. 4 and described later, and thereby the armrest board 25 is restricted from moving forward than the wire member 27.

<Bracket>

Figure 4:
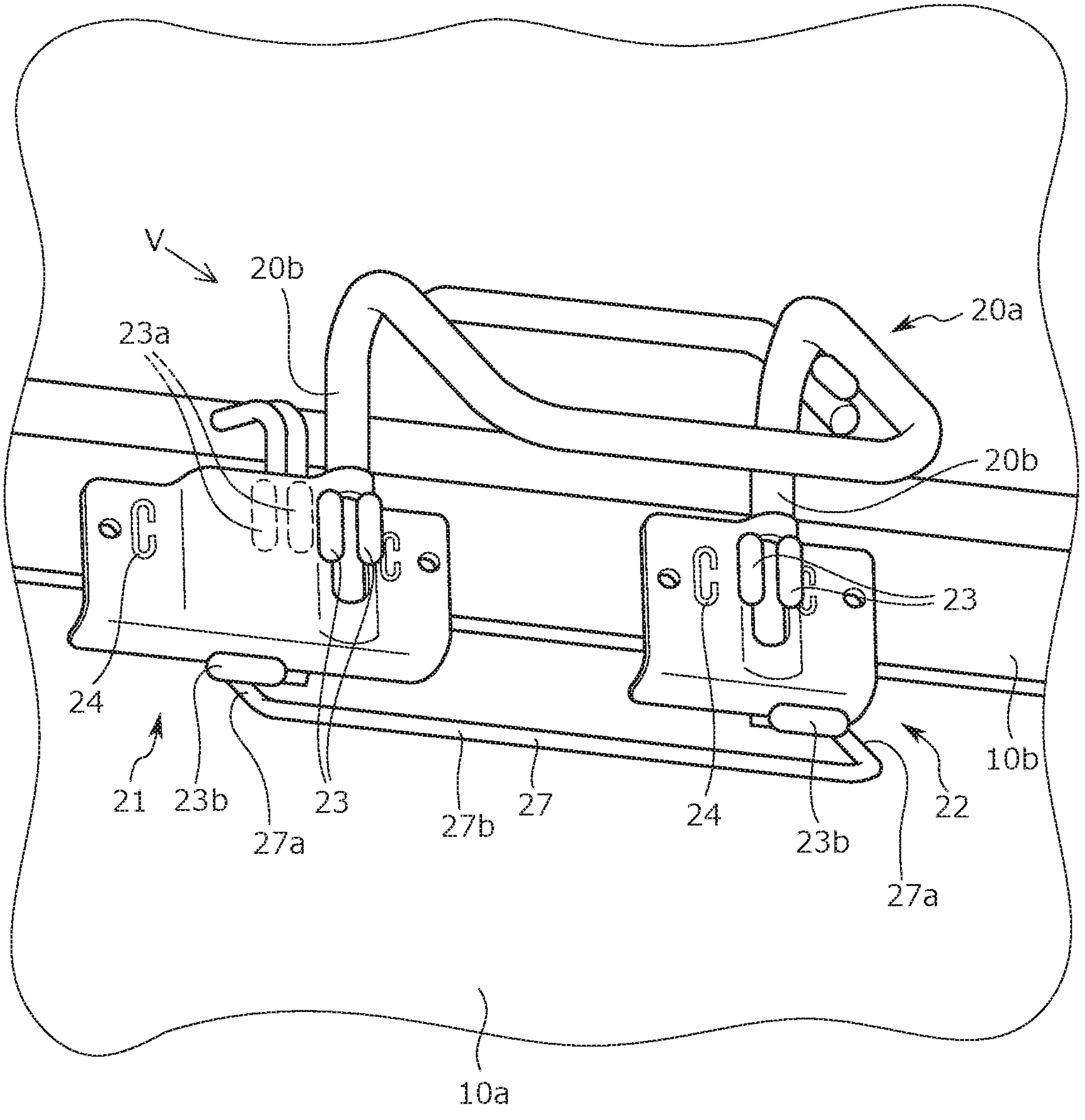
Figure 6:
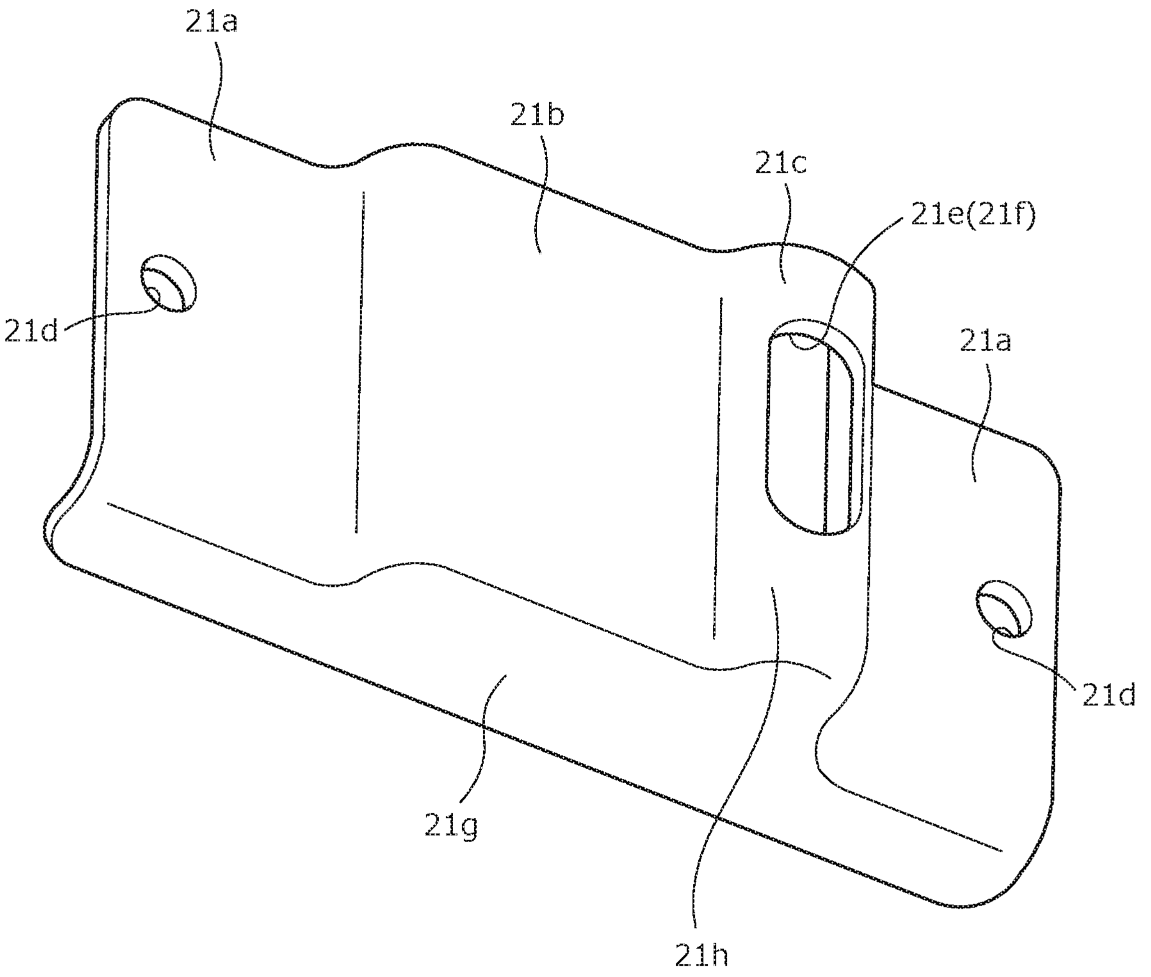
FIG. 6 is a perspective view showing the bracket.

Next, with reference to mainly FIG. 4 to FIG. 6, the brackets 21, 22 as mounting members for mounting the headrest frames 20, 20*a* and the like to the frame 10*b* will be described. In addition, FIG. 4 shows a IV portion of FIG. 2 and is a perspective view showing the brackets 21, 22 which mount the headrest frame 20*a*, FIG. 5 shows the brackets 21, 22 and the striker member 26 from a V direction of FIG. 4 and is a perspective view showing a mounted state of the striker member 26, and FIG. 6 is a perspective view showing the bracket 21.

As described before, the brackets 21, 22 are components for mounting the headrest frames 20, 20*a* and the like to the upper frame 10*b*. One bracket 21 is mounted to each one of the pillars 20*b* of the headrest frame 20*a*. On the other hand, as for five brackets 22 in total, one bracket is mounted to one of the pillars 20*b* of the headrest frame 20*a*, and four brackets are mounted to each one of two pillars 20*b* constituting each of two headrest frames 20, respectively. Moreover, to a lower cover part 21*g* described later and constituting each of the bracket 21 and the bracket 22, an end part of the wire member 27 as a connecting member formed into an angular C-shape is bonded. That is to say, the bracket 21 and the bracket 22 are connected with the wire member 27.

The wire member 27 comprises right and left first extending portions 27*a* and a second extending portion 27*b* which connects the right and left first extending portions 27*a*. The wire member 27 is bonded to the brackets 21, 22 so as to be arranged in front of the bent shape part 25*c* of the armrest board 25 in a state that the armrest board 25 and the brackets 21, 22 are mounted to the seat back frame 10*a*. The wire member 27 can restrict the movement of the armrest board 25 as described above. Furthermore, the wire member 27 connects the lower portions of the bracket 21 and the bracket 22 whose upper parts are bonded by the headrest frame 20*a*, thereby bonding strength of the bracket 21 and the bracket 22 is enhanced. It should be noted that the wire member 27 which connects the brackets 21, 22 is preferable in that it can be reduced in weight and in that interference with other members can be avoided, because of its small volume. However, if an effect of enhancing bonding strength is desired than those effects, a member which connects the brackets 21, 22 may be a plate-shaped member rather than a linear member like a wire.

(Shape of Bracket)

As shown in FIG. 6, the bracket 21 is composed of side parts 21*a* which are formed on both end sides in the seat right and left direction of the bracket 21 and welded to the upper frame 10*b*, a striker mounting wall part 21*b* to which the striker member 26 is welded, a pillar mounting wall part 21*c* to which the pillar 20*b* is welded, and the lower cover part 21*g* which covers the lower end of the pillar 20*b* from below.

Specifically, the side parts 21*a* located on the both end sides in the seat right and left direction of the bracket 21 is formed so as to extend in the same plane in the seat right and left direction along the front surface of the upper frame 10*b*. In the side parts 21*a* on the both end sides of the bracket 21, frame mounting holes 21*d* for positioning in setting to a laser welding jig are formed in symmetrical positions.

The striker mounting wall part 21*b* is formed continuously from the one side part 21*a* (on the left side in FIG. 6) to extend toward the other side part 21*a* (on the right side in FIG. 6), bulges forward from the side part 21*a*, and is formed in parallel to the side part 21*a*. In the rear of the striker mounting wall part 21*b*, the both end parts 26*b* of the striker member 26 are bonded with weld beads by arc welding applied from behind.

The pillar mounting wall part 21*c* serves as a holding part which holds with the weld beads the pillar 20*b*, and is formed along a peripheral surface of the pillar 20*b*. Specifically, the pillar mounting wall part 21*c* is formed continuously from the striker mounting wall part 21*b* to connect to the other side part 21*a* (on the right side in FIG. 6), is formed to be curved into a cross-sectional circular arc shape, and is formed to bulge forward from the striker mounting wall part 21*b*.

As thus described, the pillar mounting wall part 21*c* is formed to be curved into a cross-sectional circular arc shape along the peripheral surface of the pillar 20*b*, and thereby, when the weld beads 23 are formed between the pillar 20*b* and the pillar mounting wall part 21*c*, the weld beads 23 become easier to uniformly spread and it becomes possible to enhance bonding strength.

Moreover, the pillar mounting wall part 21*c* is formed in a different position in the seat right and left direction from the striker mounting wall part 21*b*. Therefore, the pillar 20*b* and weld bead 23 to be mounted to the pillar mounting wall part 21*c*, and the striker member 26 and weld bead 23*a* to be mounted to the striker mounting wall part 21*b* can be avoided from overlapping in the front to back direction. Accordingly, since interference in these arrangement can be avoided, the center seat Sb can be prevented from being thickened in the seat front to back direction. Furthermore, if the center seat Sb can be prevented from being thickened in the seat front to back direction, the positional relationship between the pillar 20*b* and weld bead 23 and the striker member 26 and weld bead 23*a* to be mounted to the striker mounting wall part 21*b* is not limited to different positions in the seat right and left direction. For example, different positions in a direction which intersects the seat front to back direction such as different positions in a seat up and down direction are good enough.

Moreover, in a center portion in the up and down direction of the pillar mounting wall part 21*c*, an opening 21*e* which is a long hole formed long in the up and down direction to pass through in a thickness direction of the bracket 21 is formed. Due to the opening 21*e*, when the pillar 20*b* is abutted against the rear side of the pillar mounting wall part 21*c*, the pillar 20*b* will expose to the front surface side of the bracket 21 from the opening 21*e*. Further, by applying arc welding to the pillar 20*b* and an edge portion 21*f* of the opening 21*e* from the front side of the bracket 21 in a state that the pillar 20*b* is abutted against the pillar mounting wall part 21*c* as thus described, it is possible to bond the pillar 20*b* and the bracket 21, with the weld beads 23 as holding parts.

It should be noted that an edge portion 21*f* of the opening 21*e* is formed short in the front to back direction (the thickness direction of the bracket 21) so as to extend in a direction along the opening 21*e* of long hole (in other words, a direction which intersects the front to back direction). As thus described, since the weld beads 23 extend along the opening 21*e* rather than in the front to back direction, the side seats Sa and the center seat Sb can be thinned in the seat front to back direction.

In particular, when the rear surface of the bracket is abutted against the upper frame 10*b* in order to bond the bracket 21 and the upper frame 10*b* by laser welding, bulges of the weld beads 23 in front of the bracket are not obstructive. In other words, since the weld beads 23 are not formed in the rear of the bracket 21, the pillar 20*b* can be abutted against the upper frame 10*b*. That is to say, since other members do not exist between the pillar 20*b* and the upper frame 10*b*, the side seats Sa and the center seat Sb can be further thinned in the front to back direction.

In general, when the pillar 20*b* is directly mounted to the upper frame 10*b*, a part of the upper frame 10*b* may be crushed and the pillar 20*b* may be mounted to the crushed portion. In this case, section modulus of the upper frame 10*b* is decreased, thus leading to reduction of rigidity. On the other hand, since the bracket 21 according to the present embodiment is formed into a cross-sectional circular arc shape and is welded to the pillar 20*b* in a state that the pillar 20*b* is not crushed, reduction of rigidity does not occur.

In addition, the bracket 21 is formed long downwardly below the lower end portion of the pillar 20*b*, and the lower end side of the pillar mounting wall part 21*c* serves as a front cover part 21*h* which covers the front of the lower end portion of the pillar 20*b*. As thus described, the front cover part 21*h* covers the lower end portion of the pillar 20*b*, and thereby capable of suppressing the lower end portion of the pillar 20*b* from scraping the cushion pad (not shown) and the skin 2 and damaging them.

The lower cover part 21*g* is provided continuously from the respective lower ends of the side parts 21*a* on the both end sides in the seat right and left direction, the striker mounting wall part 21*b*, and the pillar mounting wall part 21*c*, and is provided to be bent from the respective one so as to extend to the rear side and cover the lower end of the pillar 20*b* from below. As thus described, the lower cover part 21*g* covers the lower end portion of the pillar 20*b*, and thereby capable of suppressing the lower end portion of the pillar 20*b* from scraping the cushion pad (not shown) and the skin 2 and damaging them.

It should be noted that since the bracket 22 has almost the same configuration as that of the bracket 21 except that it is formed smaller in the seat right and left direction without the striker mounting wall part 21*b* of the bracket 21, a detailed description thereof will be omitted.

(Bonding by Welding)

To the bracket 21, with weld beads 23, 23*a*, 23*b* formed by arc welding, the one pillar 20*b* constituting the headrest frame 20*a*, the both end parts 26*b* of the striker member 26, and one side of the wire member 27 are bonded. Further, the side parts 21*a* of the bracket 21 and the upper frame 10*b* are bonded in a portion where a linear welding trace 24 formed in a C-shape by laser welding is formed. Specifically, in the portion where the welding trace 24 is formed, the portion fused by laser welding at the back surface side of the side part 21*a* serves as a fixed part which fixes the bracket 21 and the upper frame 10*b*. It should be noted that the welding trace 24 is not limited to a C-shape, and may be a U-shape or an O-shape. As thus described, the welding trace is linearly formed, and thereby the welding trace by laser welding can be easily formed and it is possible to perform laser welding quickly and effectively.

Moreover, to the bracket 22 of the center seat Sb, with the weld beads 23, 23*a*, 23*b* formed by arc welding, the other pillar 20*b* constituting the headrest frame 20*a*, and the other side of the wire member 27 are bonded. Moreover, to the brackets 22 of the side seats Sa, each of the pillars 20*b* on both sides constituting the headrest frame 20 is bonded.

In particular, in the bracket 21, the pillar mounting wall part 21*c* on which the weld bead 23 to be fixed to the pillar 20*b* is piled and the side part 21*a* having the portion where the welding trace 24 to be fixed to the upper frame 10*b* is formed are formed in different positions in the seat right and left direction. Therefore, the weld bead 23 and the portion where the welding trace 24 is formed do not overlap in the seat front to back direction, and the side seats Sa and the center seat Sb can be prevented from being thickened in the seat front to back direction. Furthermore, if the side seats Sa and the center seat Sb can be prevented from being thickened in the seat front to back direction, the positional relationship between the weld bead 23 and the portion where the welding trace 24 is formed is not limited to different positions in the seat right and left direction, and different positions in a direction which intersects the seat front to back direction such as different positions in a seat up and down direction are good enough.

Moreover, in the side seats Sa, separately from the seat back frame 10 large in size, the headrest frame 20 can be surely and easily fixed to the bracket 22 with the weld beads 23 by arc welding. Furthermore, the bracket 22 is laser-welded to the upper frame 10*b* of the seat back frame 10, and thereby capable of easily mounting the headrest frame 20 to the seat back frame 10 at once as a whole.

Similarly, also in the center seat Sb, separately from the seat back frame 10 large in size, the headrest frame 20*a*, the striker member 26, and the wire member 27 can be surely and easily fixed to the brackets 21, 22 with the weld beads 23, 23*a*, 23*b* by arc welding.

Furthermore, the brackets 21, 22 are laser-welded to the upper frame 10*b* of the seat back frame 10*a*, and thereby capable of easily mounting the headrest frame 20*a*, the striker member 26, and the wire member 27 to the seat back frame 10*a* at once as a whole.

Moreover, since the pillar 20*b* is completely sandwiched between the brackets 21, 22 and the seat back frames 10, 10*a*, fixity of the pillar 20*b* is very excellent. However, when sandwiching without considering fixed points, the thickness in the seat front to back direction is increased due to the bulges by the weld beads 23 and the like for fixing. As a solving means thereof, the configuration in which the weld bead 23 that is the holding part of the pillar 20*b* and the portion where the welding trace 24 that is the fixed part of the seat back frame 10*a* is formed are set in different positions in the right and left direction is adopted. Thereby, coexistence of good fixity and compactness can be realized.

In the present embodiment, the two brackets 22 of the side seats Sa and the brackets 21, 22 of the center seat Sb are described as different things, but these may be integrally formed. Furthermore, these are integrally formed, and the integrated brackets 21, 22 may serve as a member which restricts the movement of the armrest board 25 as with the wire member 27.

Moreover, the brackets 21, 22 are described as being mounted to the front surface of the upper frame 10*b* of the seat back frames 10, 10*a*, but these may be mounted to the rear surface. That is to say, in this case, the pillar 20*b* of the headrest frame 20 and the striker member 26 are arranged between the back surface of the upper frame 10*b* and the brackets 21, 22.

It should be noted that in the above embodiment, the automotive vehicle seat for rear seat has been described as an example, but it is not limited to the seat for rear seat as long as the pillar is mounted to the seat back frame with the bracket.

Furthermore, the vehicle seat has been described as an example in the above embodiment, but the present invention is applicable to seats for vehicles such as an aircraft, a ship, and an industrial machine, as well as the automotive vehicle.

What is claimed is:

1. A vehicle seat comprising:
a seat back frame;
a headrest which is provided above the seat back frame;
a pillar which supports the headrest; and
a mounting member which mounts the pillar to the seat back frame,
wherein
the mounting member has a holding part which holds the pillar and a fixed part which is mounted to the seat back frame,
the pillar is arranged between the mounting member and the seat back frame,
the holding part is formed with an opening,
the opening extends along an extending direction in which a portion of the pillar extends, the portion of the pillar being held by the holding part of the mounting member, and
a weld bead which bonds the pillar and the mounting member is formed in an edge portion of the opening.

2. The vehicle seat according to claim 1, wherein
the mounting member includes two or more mounting members provided at different positions in a seat right and left direction,
a connector which connects at least two of the two or more mounting members is provided, the connector being a wire member,
a lower cover part which extends backwardly and covers a lower end portion of the pillar from below is provided in a lower end portion of the mounting member, and
the connector is welded to the lower cover part.

3. The vehicle seat according to claim 2, wherein
the connector comprises:
right and left first extending portions which extend in a seat front to back direction; and
a second extending portion which extends in the seat right and left direction and connects the right and left first extending portions, and
a length of each of the right and left first extending portions is shorter than a length of the second extending portion.

4. The vehicle seat according to claim 2, wherein
at least one of the two or more mounting members includes a right and left fixed parts arranged separately from each other in the seat right and left direction, and
the connector is arranged to overlap at least one of the right and left fixed parts in an up and down direction in a front view of the vehicle seat.

5. The vehicle seat according to claim 1, further comprising:
a striker member provided at a different position from the pillar in a direction which intersects a seat front to back direction,
wherein
the mounting member includes a striker mounting wall part to which the striker member is mounted, and
the striker mounting wall part is located on a rear side of the holding part in the seat front to back direction.

6. The vehicle seat according to claim 1, further comprising:
a striker member provided at a different position from the pillar in a direction which intersects a seat front to back direction,
wherein
the mounting member includes a striker mounting wall part to which the striker member is mounted, and
the fixed part is located on a rear side of the striker mounting wall part in the seat front to back direction.

7. The vehicle seat according to claim 1, further comprising:

a striker member provided at a different position from the pillar in a direction which intersects a seat front to back direction, wherein the striker member is fixed to the mounting member at a position separated from the pillar.

8. The vehicle seat according to claim 1, further comprising:

a striker member provided at a different position from the pillar in a direction which intersects a seat front to back direction, wherein the striker member is fixed to the mounting member and in contact with the pillar.

9. The vehicle seat according to claim 1, further comprising:

a striker member provided at a different position from the pillar in a direction which intersects a seat front to back direction, wherein the striker member comprises:

an annular part arranged at a rear side of the seat back frame; and end parts arranged at a front side of the seat back frame and welded to a rear surface of the mounting member.

* * * * *